United States Patent [19]

Stuck

[11] 4,332,189
[45] Jun. 1, 1982

[54] APPARATUS FOR PREPARATION OF FOODSTUFFS, PARTICULARLY SAUSAGES AND BUNS

[75] Inventor: Robert M. Stuck, Clover, S.C.

[73] Assignee: Marshall Air Systems, Inc., Charlotte, N.C.

[21] Appl. No.: 150,680

[22] Filed: May 16, 1980

[51] Int. Cl.³ .................. A47J 27/10; A47J 27/12
[52] U.S. Cl. .................. 99/339; 99/404; 99/407; 99/408; 99/441; 99/443 C
[58] Field of Search ........... 99/339, 441, 404, 407, 99/330, 408, 443 C, 386; 426/523

[56] References Cited

U.S. PATENT DOCUMENTS

| | | | |
|---|---|---|---|
| 2,319,561 | 5/1943 | Scharsch | 99/404 |
| 2,418,519 | 4/1947 | McBeth | 99/408 |
| 2,566,524 | 9/1951 | Kammins | 99/441 |
| 2,649,852 | 8/1953 | McCandless | 99/441 |
| 3,316,833 | 5/1967 | Williams | 99/404 |
| 3,456,578 | 7/1969 | Pinsly | 99/386 |
| 3,682,664 | 8/1972 | Bennett | 99/441 X |
| 3,761,290 | 9/1973 | Brunner | 99/404 |
| 4,154,152 | 5/1979 | Lang-Ree | 99/386 |
| 4,197,791 | 4/1980 | Vieceli | 99/441 X |

FOREIGN PATENT DOCUMENTS 708577  6/1966  Italy ...................... 99/404

*Primary Examiner*—Billy J. Wilhite
*Attorney, Agent, or Firm*—Bell, Seltzer, Park & Gibson

[57] ABSTRACT

An apparatus and method for preparing foodstuffs, and particularly sausages and buns such as hot dogs. A reservoir containing heated water is provided and sausages are immersed in and moved through the heated water by a conveyor while buns are moved through heated vapor from the heated water to heat the sausages and buns to a desired serving temperature.

6 Claims, 6 Drawing Figures

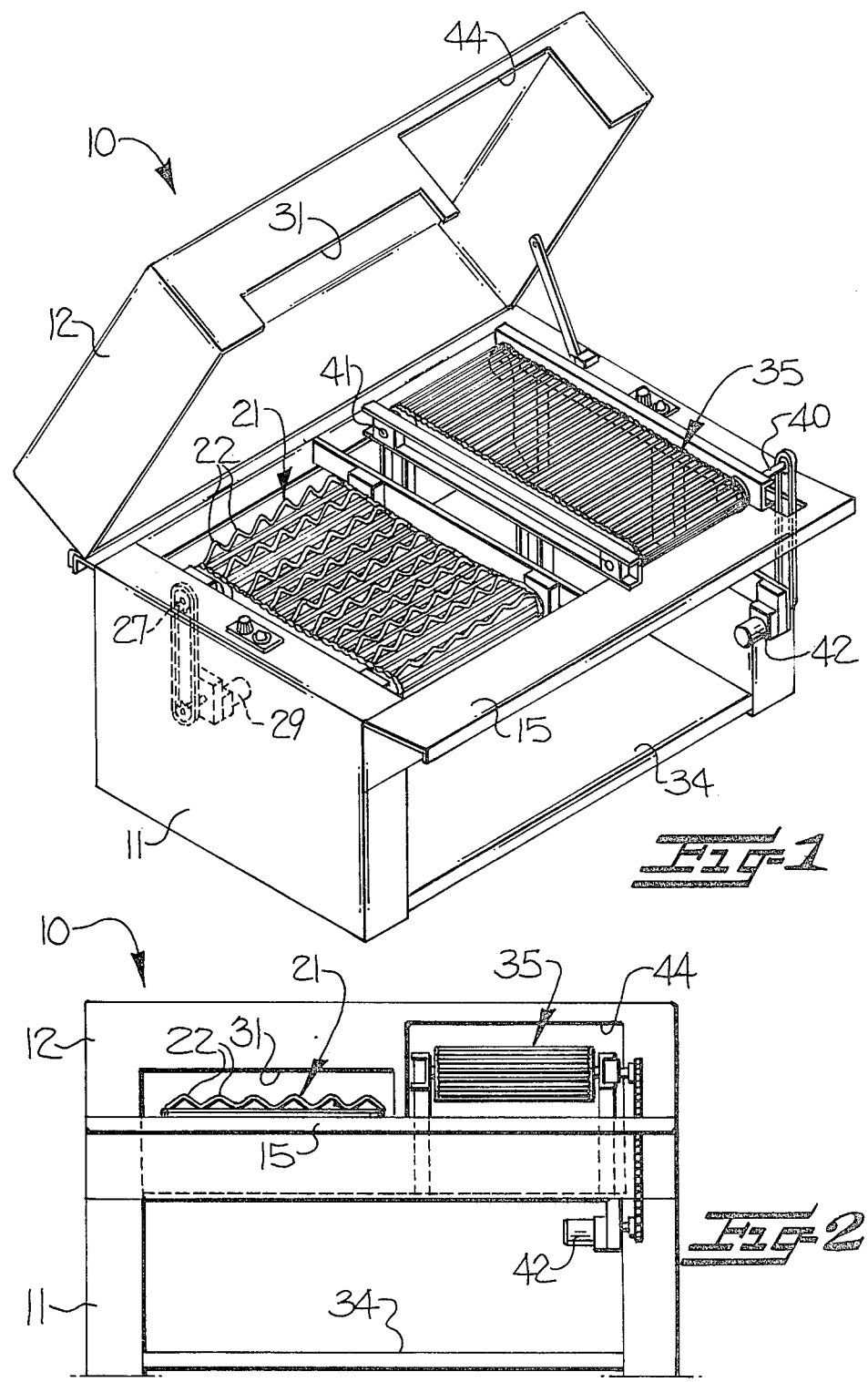

APPARATUS FOR PREPARATION OF FOODSTUFFS, PARTICULARLY SAUSAGES AND BUNS

FIELD AND BACKGROUND OF INVENTION

Sausage is a widely known and consumed foodstuff which, particularly in the United States of America, has been adapted to informal and fast service food preparation and sale. In particular, Americans are well known for consumption of hot dogs, usually served by preparing sausages and buns and inserting the sausages into the buns.

As fast service restaurants have developed in the United States, attention has been turned toward improved methods and apparatus for preparing foodstuffs, including hot dogs. Grill apparatus of varying kinds, including heated rollers and rotisserie structures have been developed and used in efforts to meet requirements for fast food service of sausages and buns such as hot dogs. However, research into the quality of the product delivered has reflected difficulties with such prior grill apparatus and methods.

More particularly, consumer preference appears to be for hot dogs which have been prepared by heating in hot water or steam and which are served in buns which are somewhat moist and at an elevated temperature. While a consumer will prefer such foodstuffs, difficulties are encountered in accommodating the preparation and serving of such foodstuffs, particularly in relatively high volumes. More specifically, optimal presentation of the foodstuffs requires that the internal temperatures of the sausage and the bun be at certain levels, thus requiring that the sausage and bun be subjected to heating for a time sufficient to raise the temperatures to those desired levels. However, heating must be accomplished in such a manner as to not extend a holding period for the foodstuff for an unacceptably long time. Where sausages such as hot dogs are held for an unacceptably long time in a heated water bath, the sausage may split or otherwise take on an unattractive appearance, flavor is lost or leached out, and oil or grease released from the foodstuffs may form a floating layer on the hot water bath possibly imparting an undesirable flavor to the foodstuffs.

BRIEF DESCRIPTION OF INVENTION

With the aforementioned characteristics of prior apparatus and methods in mind, it is an object of this invention to prepare foodstuffs such as sausages and buns of the type known as hot dogs in a manner particularly adapted to fast service restaurants and the like. In realizing this object of the present invention, provision is made for preparing sausages at a high volume rate and in a manner consistent with consumer taste preferences. That is, sausages are heated by being immersed in and moved through heated water contained in a reservoir.

Yet a further object of the present invention is the provision of apparatus for preparing foodstuffs, and particularly hot dogs, capable of preparing relatively high volumes of foodstuffs while maintaining high levels of consumer appeal for the prepared foods. In realizing this object of the present invention, conveyors are arranged for moving foodstuffs, such as hot dog sausages and buns, through heating zones provided within a housing. A sausage conveyor immerses hot dogs in and moves the hot dogs through heated water contained in a reservoir within the housing. At the same time, a bun conveyor receives buns and moves the buns through an area where moist heat including vapor from the heated water subjects the buns to elevated temperatures. By arranging the conveyors for receiving foodstuffs introduced into the housing and for discharging heated foodstuffs therefrom, hot dogs may be prepared at a relatively high rate of production per unit of time.

BRIEF DESCRIPTION OF DRAWINGS

Some of the objects of the invention having been stated, other objects will appear as the description proceeds, when taken in connection with the accompanying drawings, in which FIG. 1 is a perspective view, partly in phantom, of the apparatus of the present invention with a housing lid portion raised to expose certain components to view;

FIG. 2 is an elevation view of the apparatus of FIG. 1, showing the housing cover closed;

DETAILED DESCRIPTION OF INVENTION

Figure 3:
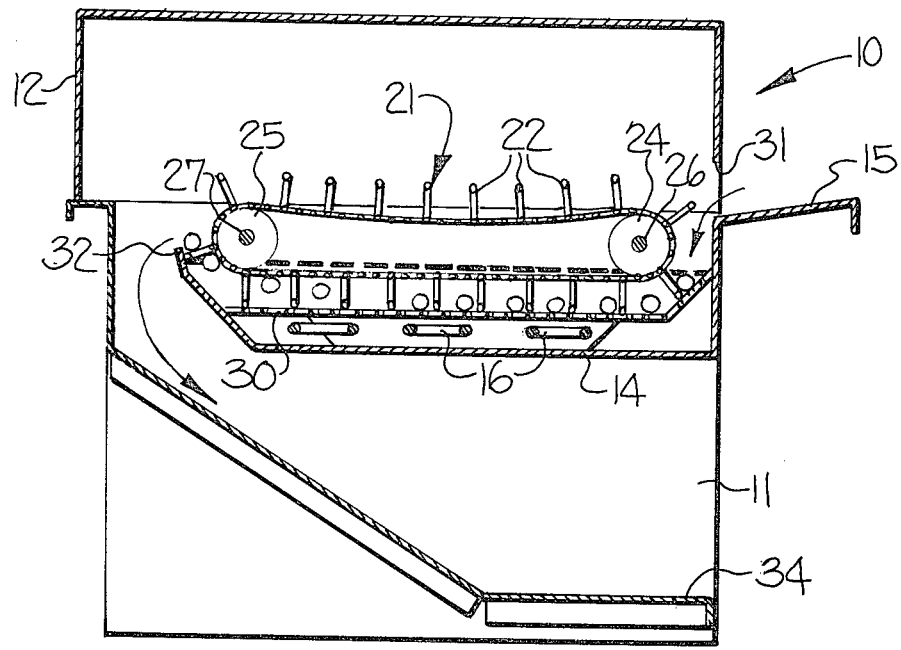
FIG. 3 is an elevation view, in section, through the apparatus of FIGS. 1 and 2 and particularly showing the immersion and movement of sausage foodstuffs such as hot dogs.
Figure 4:
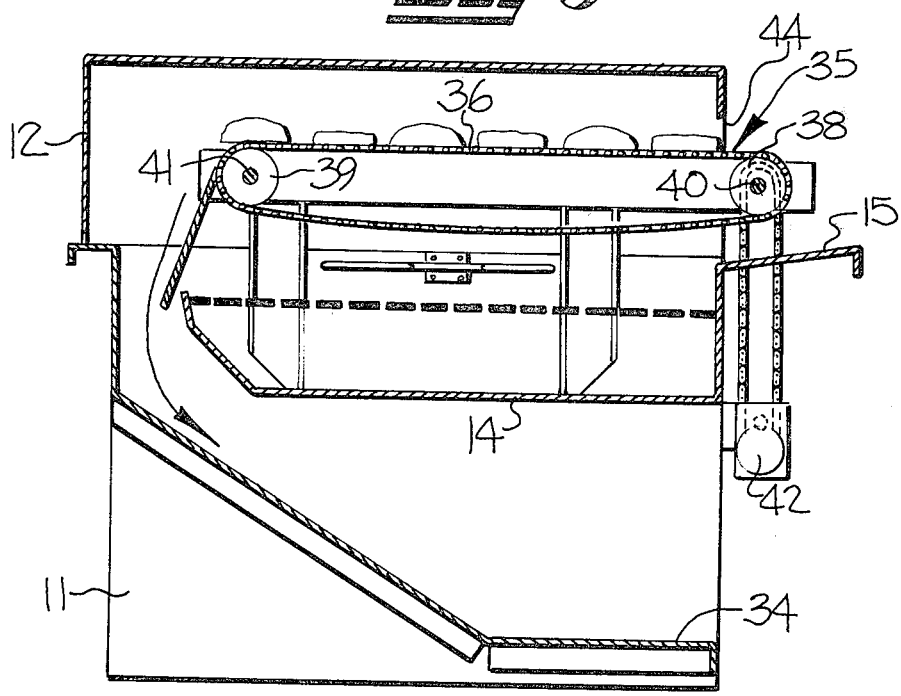
FIG. 4 is a view similar to FIG. 3, particularly showing the conveyance and heating of buns.

While the present invention will be described hereinafter with particular reference to the accompanying drawings, which show a preferred form for the apparatus of this invention, it is to be understood at the outset of the description which follows that it is contemplated that persons of ordinary skill in the relevant arts may modify the apparatus shown while achieving the desirable results of the present invention. Accordingly, the description which follows is to be understood as a broad and general teaching directed to persons of ordinary skill in the applicable arts and enabling them to practice the invention through apparatus differing from that here specifically shown. Accordingly, the description is not to be taken as limiting on the specific forms which the invention may take.

Referring now more particularly to the drawings, the form of apparatus of the present invention there shown (and generally identified at 10) is particularly intended for use by an operator who would both insert and remove sausages such as hot dogs and buns to be served with the hot dogs from a common side of the apparatus. As described more fully hereinafter, the apparatus includes housing means in the form of a lower housing 11 and an upper housing or cover 12 which cooperate for defining an inlet and an outlet for the introduction and discharge of foodstuffs, particularly sausages and buns such as are served as hot dogs. Within the housing means 11, 12 is a reservoir for containing water. In the form illustrated, the reservoir is formed at least in part by a pan member 14. A forwardly extending lip portion 15 extends widthwise of the lower housing 11 and cooperates with openings in the upper housing or cover 12 for facilitating introduction of sausages and buns into the apparatus 10.

Figure 5:
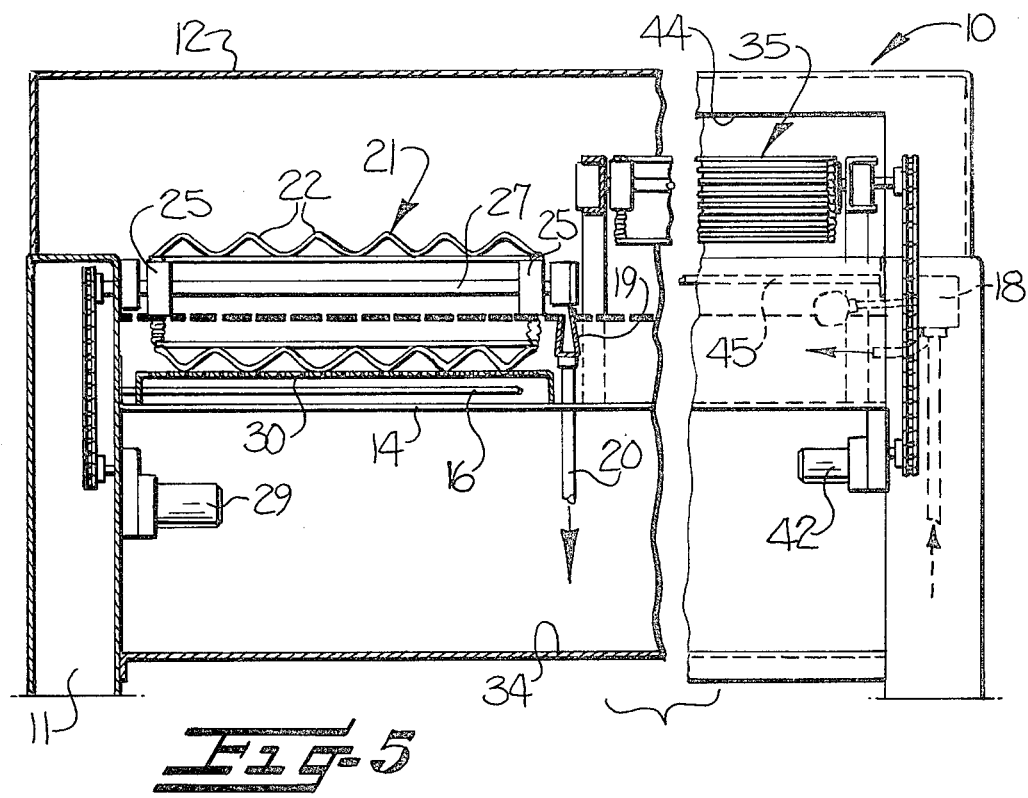
FIG. 5 is an enlarged elevation view, partially in section, through the apparatus of FIGS. 1 and 2, taken generally at right angles of the views of FIGS. 3 and 4.
Figure 6:
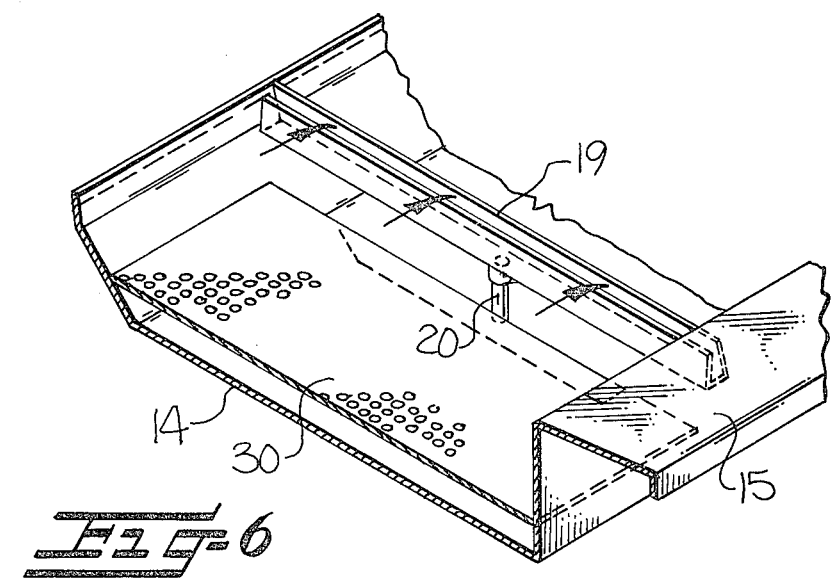
FIG. 6 is a perspective view of portions of the apparatus of FIGS. 1 and 5, illustrating particularly a drain for surface skimming of heated water contained in the apparatus of the present invention.

In order to provide for warming of the sausages and buns as described more fully hereinafter, means are provided for heating water contained in the reservoir. Preferably, the means for heating water takes the form of an electrical immersion heater 16 mounted to be positioned within the pan member 14 and below the surface of water contained therein. Preferably, the immersion heater 15 is mounted and arranged for ready removal, in order to facilitate cleaning the apparatus as is required in food service establishments. The level of water contained within the reservoir is controlled by the particular cooperation of a float valve 18 (FIG. 5) and a skimmer means generally indicated at 19 (FIGS. 5 and 6). The skimmer means 19 drains surface borne grease and the like from heated water contained in the reservoir means, in a manner similar to an edge gutter in a swimming pool, by providing for relatively low flow rates of water through the reservoir, on the order of one or two gallons per hour. The skimmer means 19 is constructed and arranged for the flow of water into a drain line 20 from that portion of the reservoir means in which sausages are heated, thereby skimming the surface of that portion of the water contained in the reservoir.

In order to heat and deliver substantial quantities of sausages such as hot dogs, the apparatus 10 of the present invention includes sausage conveyor means for immersing sausages in and for moving immersed sausages through heated water contained in the reservoir means. The sausage conveyor means, in the form illustrated, comprises an endless conveyor member generally indicated at 21 for engaging sausages. The endless conveyor member 21 preferably is a chain conveyor having, on at least certain links thereof, projecting fingers 22. Adjacent pairs of fingers define therebetween spaces for receiving and retaining sausages being immersed and moved (FIG. 3). The conveyor member 21 is mounted by appropriate means, such as a set of sprockets 24, 25 mounted on appropriate shafts 26, 27. The sprockets 24, 25 mount the chain 21 for movement along a closed path of travel having a lower run immersed in the heated water contained in the reservoir means. An appropriate drive means, illustrated in phantom lines in FIG. 1 as an electrical motor 29, is operatively connected with one shaft 27 and thereby with the conveyor member 21 for moving the conveyor member along the path of travel and thereby for moving immersed sausages. The lower run of the conveyor member 21 passes adjacent a perforated metal support plate 30 (FIGS. 5 and 6) disposed within the reservoir means and cooperating with the conveyor member 21 in the handling of sausages.

More particularly, the reservoir and the sausage conveyor cooperate for maintaining an immersed sausage submerged within heated water for a predetermined interval of time. A sausage introduced into the apparatus 10 through the inlet generally indicated at 31 (FIG. 3) falls into the heated water retained within the reservoir means and, due to a then negative buoyancy, falls to the perforated plate 30. The sausage is then moved toward the rear of the apparatus 10 by the operation of the conveyor means. As the sausage is heated, it achieves a positive buoyancy and begins to float toward the surface. As the sausage floats, it engages the links of the sausage conveyor and is held submerged for the predetermined interval of time required for the conveyor to move the sausage to a lifting or exit point (FIG. 3). At the lifting or exit point, the projecting fingers 22 of the sausage conveyor means lift the heated sausage over a rear lip portion 32 of the pan 14, to drop freely within the lower housing 11 and be delivered at an outlet generally indicated at 34.

In order to coordinate the heating of sausages and the heating of buns in which the sausages will be served, the apparatus additionally includes a bun conveyor means for engaging buns. The bun conveyor means, generally indicated at 35, cooperates with the reservoir means for subjecting engaged buns to moist heat including heated vapor from heated water contained in the reservoir means. Preferably, and in the form illustrated, the bun conveyor means takes the form of an endless chain conveyor member 36 mounted within the apparatus 10 to one side of the sausage conveyor (FIGS. 1, 2 and 5). By means of appropriate sprockets 38, 39 mounted on respective shafts 40, 41, the conveyor mwember 36 is supported for movement above the heated water retained in the reservoir means of the apparatus 10. Drive means, shown in the form of an electrical motor 42, is operatively connected with the bun conveyor member for moving the conveyor member along a closed path of travel having an upper run which forms a horizontal surface for transporting buns rearwardly through the cover 12. Buns are introduced through an inlet generally indicated at 44 and are dropped within the lower housing 11 to exit through the outlet 34.

While consumer preference is for a bun which has been warmed in moist heat, it has been noted that the heating rate for sausages is such that maintaining comparable production for heated buns is facilitated by a provision for supplemental heating. Accordingly, it is contemplated that auxiliary bun heating means will be provided for heating buns engaged by the bun conveyor means 35 and thereby for supplementing heating otherwise occurring from subjection of the buns to heated vapor. Such auxiliary bun heating means preferably takes the form of an electrical resistance heating unit 45 positioned above the level of water contained in the reservoir and below the upper run of the bun conveyor means.

It is peferred that sausages be served at an internal temperature of approximately 13 degrees F. and that buns be served at an internal temperature of approximately 135 degrees F. Further, it is preferred that the sausages be heated at water that is at a temperature less than boiling. Thus, it is preferred that the water retained in the reservoir be maintained at a temperature of approximately 200 degrees F. Such a water temperature will result in a saturated dry bulb temperature within the apparatus 10 of approximately 150 degrees F. Inasmuch as the preferred taste and texture for the foodstuffs is achieved when the foodstuffs are served as they reach the temperatures mentioned above, the dwell times for foodstuffs passing through the heating zones defined within the apparatus are determined to achieve that result. That is, the speeds with which the sausage conveyor means and the bun conveyor means move are determined to be such as to provide only sufficient dwell time within the apparatus for the sausage and bun to be heated to the desired internal temperature. With respect to the bun conveyor, the speed of bun movement is additionally coordinated with the heating achieved by the auxiliary bun heating means, in order to accommodate coordination of heating of buns and of sausages. The apparatus described above, when operated in a manner consistent with the objectives here defined, is capable of preparing the foodstuffs described in such a manner as to deliver five hundred or more hot dogs per hour.

While the apparatus described above provides for preparation of both sausages and buns, by the inclusion of respective conveyors and heating zones, it will be appreciated that these functions may be separated if desired. Further, the conveyors and heating zones may be adapted to other foodstuffs. The heating accomplished in the heating zones may use alternative heat sources and fluids, such as steam generated in or remotely from the apparatus.

In the drawings and specification, there has been set forth a preferred embodiment of the invention, and although specific terms are employed, they are used in a generic and descriptive sense only and not for purposes of limitation.

That which is claimed is:

1. Apparatus for preparing foodstuffs and particularly sausages and buns such as hot dogs and comprising:
    housing means defining a foodstuff heating chamber having an inlet and an outlet for the introduction and discharge of foodstuffs;
    shared heating means for heating said chamber and both sausages and buns passing therethrough and including reservoir means within said housing means for containing water and means for heating water contained in said reservoir means to an elevated temperature less than boiling;
    sausage conveyor means mounted in said housing means for immersing sausages in heated water contained in said reservoir means and for maintaining immersed sausages submerged while moving immersed sausages through heated water so as to heat the sausages to a predetermined internal temperature; and
    bun conveyor means mounted in said housing means overlying said reservoir means and adjacent and to one side of said sausage conveyor means for engaging buns and for subjecting engaged buns to moist heat including heated vapor from heated water contained in said reservoir means so as to heat the buns to a predetermined internal temperature;
    said conveyor means being arranged relative to said inlet and said outlet for receiving foodstuffs introduced thereinto and for discharging heated foodstuffs therefrom.

2. Apparatus according to claim 1 wherein said reservoir means comprises skimmer means for draining surface borne grease and the like from heated water contained in said reservoir means.

3. Apparatus according to claim 1 wherein said means for heating water comprises immersion heater means mounted on said reservoir means for immersion into water contained therewithin.

4. Apparatus according to claim 1 wherein said sausage conveyor means comprises an endless conveyor member for engaging sausages; means mounting said conveyor member for movement along a closed path of travel having a run immersed in heated water contained in said reservoir means; and drive means operatively connected with said conveyor member for moving said conveyor member along said path of travel and thereby for moving immersed sausages.

5. Apparatus according to claim 1 further comprising auxiliary bun heating means for heating buns engaged by said bun conveyor means and thereby for supplementing heating otherwise occuring from subjection of buns to heated vapor.

6. Apparatus for preparing foodstuffs and particularly sausages and buns such as hot dogs and comprising:
    upper housing means and lower housing means cooperating for defining a foodstuff heating chamber having an inlet and an outlet on a common side of the apparatus for the introduction and discharge of foodstuffs, said lower housing means additionally defining a foodstuff passageway;
    shared heating means for heating said chamber and both sausages and buns passing therethrough and including reservoir means for containing water and located within said housing means and overlying said foodstuff passageway and means for heating water contained in said reservoir means to an elevated temperature less than boiling;
    sausage conveyor means mounted in said housing means for immersing sausages in heated water contained in said reservoir means and for maintaining immersed sausages submerged while moving immersed sausages through heated water so as to heat the sausages to a predetermined internal temperature; and
    bun conveyor means mounted in said housing means overlying said reservoir means and adjacent and to one side of said sausage conveyor means for engaging buns and for subjecting engaged buns to moist heat including heated vapor from heated water contained in said reservoir means so as to heat the buns to a predetermined internal temperature;
    said conveyor means being arranged relative to said inlet and said outlet and said foodstuff passageway for receiving said foodstuffs introduced into said inlet and for discharging heated foodstuffs into said passageway for delivery through said outlet.

* * * * *

UNITED STATES PATENT AND TRADEMARK OFFICE
CERTIFICATE OF CORRECTION

PATENT NO. : 4,332,189
DATED : June 1, 1982
INVENTOR(S) : Robert M. Stuck

It is certified that error appears in the above-identified patent and that said Letters Patent are hereby corrected as shown below:

Column 4, Line 45 delete "13" and insert therefore -130-.

Signed and Sealed this

Seventeenth Day of August 1982

[SEAL]

Attest:

Attesting Officer

GERALD J. MOSSINGHOFF
Commissioner of Patents and Trademarks